United States Patent [19]

Hoover

[11] Patent Number: 4,894,959
[45] Date of Patent: Jan. 23, 1990

[54] METHOD AND APPARATUS FOR CLEANING A SURFACE UTILIZING SHOT BLASTING

[75] Inventor: Robert E. Hoover, Toledo, Ohio

[73] Assignee: Hoover & Wells, Inc., Toledo, Ohio

[21] Appl. No.: 196,486

[22] Filed: May 19, 1988

[51] Int. Cl.[4] ............................................. B24C 3/06
[52] U.S. Cl. ........................................ 51/429; 51/425; 51/432
[58] Field of Search ............... 51/429, 424, 425, 432, 51/430, 431, 433, 434

[56] References Cited

U.S. PATENT DOCUMENTS

| | | | |
|---|---|---|---|
| 1,763,397 | 6/1930 | Hutchinson | 15/352 |
| 2,818,176 | 12/1957 | Polich | 51/430 |
| 3,598,446 | 8/1971 | Hatcher | 51/424 |
| 3,660,943 | 5/1972 | Barnthouse | 51/426 |
| 3,691,689 | 9/1972 | Goff | 51/424 |
| 3,704,552 | 12/1972 | Beaver et al. | 51/412 |
| 3,756,377 | 9/1973 | Goff | 198/523 |
| 3,858,359 | 1/1975 | Leliaert | 51/425 |
| 3,877,175 | 4/1975 | Snyder | 51/425 |
| 4,052,820 | 10/1977 | Bergh | 51/423 |
| 4,121,388 | 10/1978 | Wilson | 51/429 |
| 4,366,671 | 6/1982 | Nelson | 51/424 |
| 4,376,358 | 3/1983 | Shelton | 51/429 |
| 4,377,922 | 3/1983 | Bergh | 51/424 |
| 4,382,352 | 5/1983 | Nelson | 51/424 |
| 4,406,092 | 9/1983 | Lake et al. | 51/425 |
| 4,416,092 | 11/1983 | Nelson | 51/425 |
| 4,433,511 | 2/1984 | Swain | 51/424 |
| 4,646,481 | 3/1987 | Dickson | 51/432 |
| 4,693,041 | 9/1987 | Dickson | 51/432 |

FOREIGN PATENT DOCUMENTS 0306951 6/1971 U.S.S.R. ............................. 51/429

OTHER PUBLICATIONS

Porta Shot Blast Cleaning Machines; Nelco Mfg. Inc.; Aug. 1984.
Turbo Blast; Philip Johnson Corporation; May 1985.

Primary Examiner—Robert Rose
Attorney, Agent, or Firm—Marshall & Melhorn

[57] ABSTRACT

A surface is treated by rotating a blast wheel to direct shot at the surface. The blast wheel is enclosed by a blast head mounted on a frame supported on the surface by a plurality of wheels. At least two of the wheels are driven by hydraulically actuated motors supplied from a reservoir by a first hydraulic pump. A second hydraulic pump is also connected to the reservoir for actuating a fan motor to drive a fan and create suction to draw the shot and loosened contaminants through a filtering system with an automatic purge control.

20 Claims, 5 Drawing Sheets

METHOD AND APPARATUS FOR CLEANING A SURFACE UTILIZING SHOT BLASTING

BACKGROUND OF THE INVENTION

The present invention relates generally to a method and apparatus for cleaning a surface by shot blasting and, more particularly, to a self-propelled steel shot blasting apparatus and its method of use.

There are several methods of preparing a concrete surface for coating with an epoxy paint or the like. For example, chemicals can be utilized to dissolve a previous coating layer and/or stains on the concrete surface. However, such chemicals can be toxic and highly corrosive making them dangerous to handle and difficult to utilize inside a building. Another method of preparing a concrete surface is to utilize a sand blasting technique in which small grains of silica substance are directed against the concrete surface at high velocity in order to abrasively remove the previous coating and provide a relatively uniform surface for the new coating. However, such a method, commonly known as "sandblasting", tends to generate a substantial amount of dust from both the material being removed and the silica particles.

An alternate method of preparing a concrete surface, especially where large surfaces are involved and/or the surface is inside a building, is the use of shot blasting. Shot blasting involves a plurality of small steel balls which are directed against the surface at high velocity in order to dislodge the material to be removed. The material being removed is sucked into a collection chamber after being separated from the steel shot which is recycled for further use.

The shot blasting method is superior to the chemical cleaning techniques which tend to leave loose surface particles and create hazardous fumes. Furthermore, the residue left by chemical cleaners must be neutralized and cleaned away with water which tends to leave moisture in the concrete floor. Moisture is also left by water blasting which has a tendency not to remove the more well adhered materials. Sand blasting tends to plug pores in the concrete surface with dust. Other methods of mechanical abrasion create similar airborne contamination problems.

SUMMARY OF THE INVENTION

The present invention concerns a self-propelled, self-contained shot blasting apparatus. A tube frame is supported on a pair of rearwardly mounted drive wheels and a front mounted wheel. The frame supports an enveloping body which protects the mechanical systems of the apparatus. Power is provided by a propane fueled engine which drives a pair of hydraulic pumps. A first one of the hydraulic pumps supplies hydraulic fluid to a pair of drive motors, one drive motor attached to an associated one of the drive wheels by a chain and sprockets. The first hydraulic pump is also connected to a mechanism for lifting the front wheel when maneuvering over obstacles or to ease loading onto a trailer.

The second hydraulic pump is connected to a fan motor for creating suction utilized in a dust collection system which includes a plurality of filters. A timing circuit periodically directs compressed air in a reverse direction through the filters to clean them.

A blast head chamber is formed of long lasting steel and encloses a blast wheel having a plurality of radially extending external fins. Steel shot is introduced into the chamber through a control door to enable the operator to control the blasting operation. The steel shot is projected centrifugally at high speed from the blast head downwardly onto the surface to be cleaned. Suction is applied to remove the dislodged material to a collection area in the apparatus. A magnetic shot retriever surrounds the opening from the blast head chamber to the surface to be cleaned to trap the steel shot which can then be returned to the supply chamber. However, most of the shot is drawn into a passageway with the dislodged material and is separated by weight before being returned to the supply chamber. A rotatable wear bar is positioned inside the blast chamber in order to absorb a portion of the energy of the thrown shot, thereby retarding the destructive force of the shot on the chamber walls to increase the life of the chamber walls.

DESCRIPTION OF THE PREFERRED EMBODIMENT

Figure 1:
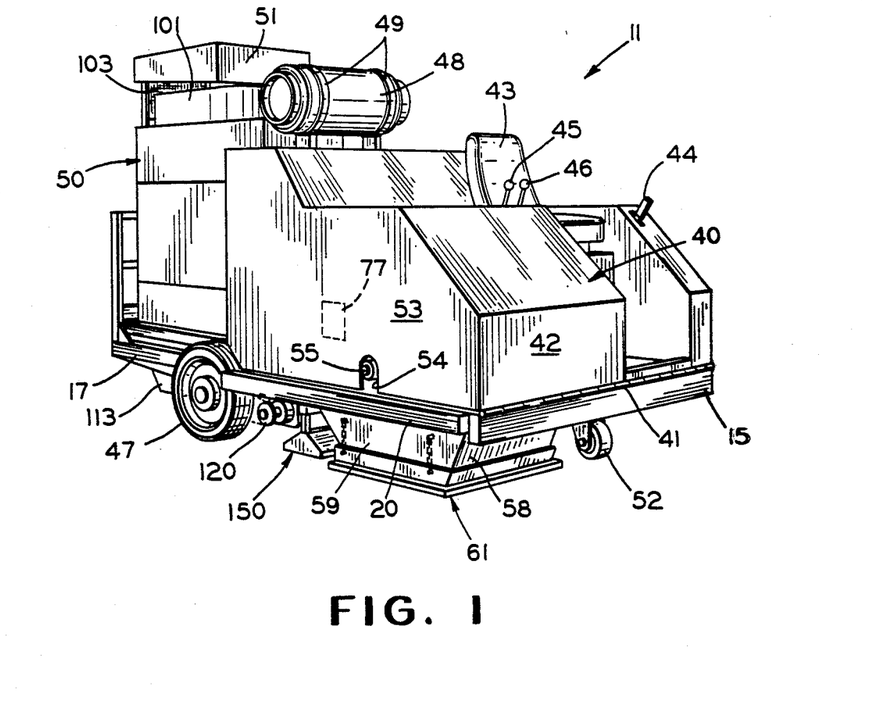
FIG. 1 is a perspective view of a shot blast cleaning apparatus in accordance with the present invention.
Figure 2:
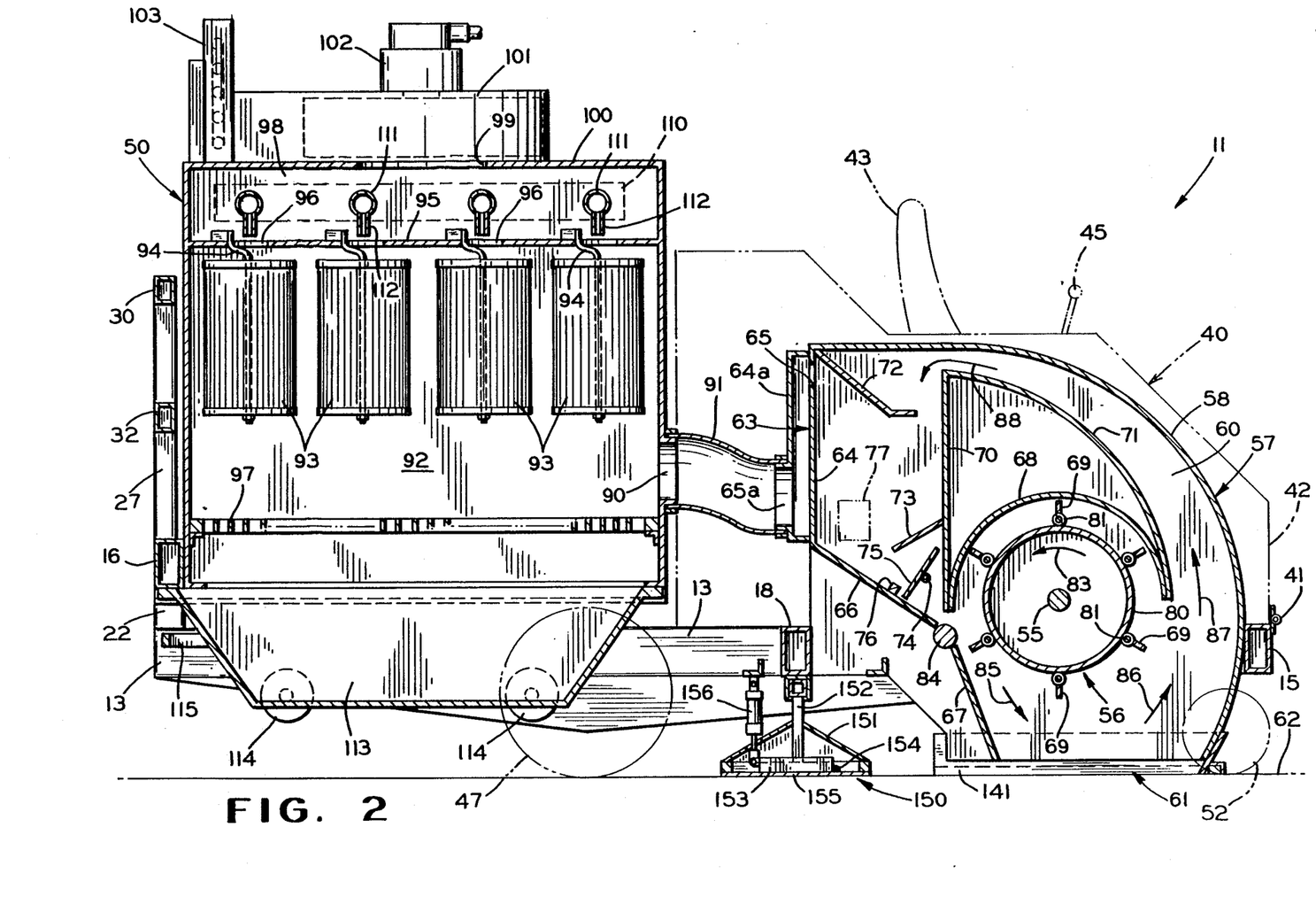
FIG. 2 is a side elevational view in cross-section of the apparatus shown in FIG. 1.
Figure 3:
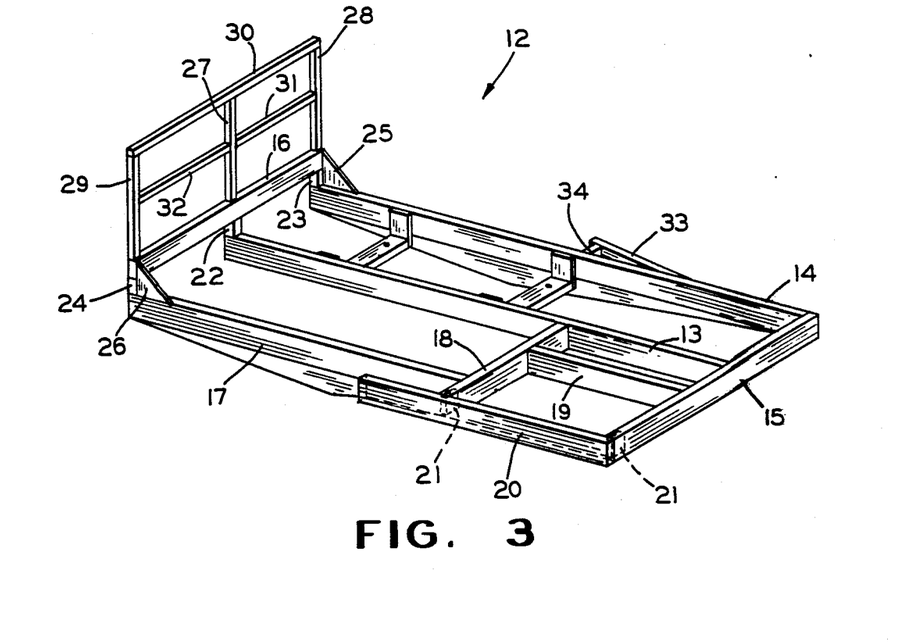
FIG. 3 is a perspective view of the frame for the apparatus shown in FIGS. 1 and 2.

A mobile self-contained, self-propelled shot blast cleaning apparatus 11, in accordance with the present invention, is shown in FIGS. 1 and 2. The mechanical systems of the apparatus 11 are mounted on a tubular frame 12 which is best shown in FIG. 3. The frame 12 is constructed of box beams which are attached together by any suitable means such as welding. A longitudinally extending center beam 13 and a longitudinally extending driver's side beam 14 are each attached at one end to a transversely extending front beam 15 and at an opposite end to a transversely extending rear beam 16. The frame 12 is asymmetrical having an opposite side longitudinally extending beam 17 attached to the rear beam 16 and extending forward to a transversely extending stub beam 18. The stub beam 18 is spaced rearwardly from the front beam 15 and is generally parallel thereto, and is attached at one end to the center beam 13. A longitudinally extending brace beam 19 is attached between the front beam 15 and the stub beam 18 and is positioned inwardly toward the center beam 13 from the opposite side beam 17. A longitudinally extending removable bumper 20 has a pair of spaced apart extensions 21 attached thereto which extensions extend into the open ends of the front beam 15 and the stub beam 18 and are releasably attached thereto by any suitable means such as fasteners (not shown).

The rear beam 16 is positioned above the ends of the beams 13, 14 and 17 and is attached thereto by vertically extending posts 22, 23 and 24 respectively. Additional rigidity is provided by a pair of triangularly shaped gussets 25 and 26. The gusset 25 is attached to the beams 14 and 16, and to the post 23. The gusset 26 is attached to the beams 16 and 17, and to the post 24.

The mechanical systems which are mounted at the rear of the frame are protected by a fence-like structure having three vertically extending posts 27, 28 and 29 attached to an upper surface of the rear beam 16 above the posts 22, 23 and 24 respectively. A horizontally extending rail 30 is attached to the upper end of the posts 27, 28 and 29, an intermediate rail 31 is attached between the posts 27 and 28, and an intermediate rail 32 is attached between the posts 27 and 29.

A fixed bumper 33 has one end attached to an outer side of the beam 14 approximately opposite the position of the stub beam 18. The fixed bumper 33 extends rearwardly and outwardly at an angle from the beam 14 and is attached adjacent its rearward end to the beam 14 by a bracket 34. The bumper 33 protects the drive wheel on the driver's side of the frame 12 and the stub beam 18 and the bumper 20 protect the drive wheel on the opposite side of the frame.

Referring to FIGS. 1 and 2, the apparatus 11 includes a forward body section 40 which is attached to the front beam 15 by a hinge 41 extending the full length of the beam 15. The body 40 has a front wall 42 with an opening formed therein to provide access to a driver's seat 43 mounted on the body section 40. A shot door control lever 44 extends through a slanted portion of the front wall 42 in a position accessible to the driver's left hand. A pair of levers 45 and 46 extend through an upper surface of the body 40 in a position easily accessible to the driver's right hand. The lever 45 controls the movement of a drive wheel 47 adjacent the bumper 20 while the lever 46 controls the movement of the drive wheel (not shown) on the driver's side of the apparatus 11. A fuel tank 48 is releasably mounted by a pair of straps 49 to an upper rear surface of the body section 40. A rear body section 50 encloses the dust collection system. Typically, the fuel tank 48 can contain liquid propane which is utilized to fuel the engine of the apparatus which in turn drives the hydraulic system which will be described below. A dust cover 51 is mounted on top of the rear body section 50 to enclose and protect a hydraulic motor for a fan and a radiator.

Also shown in FIGS. 1 and 2 is a front wheel 52 which is connected to the frame 12 as will be discussed in detail below. A sidewall 53 of the body section 40 has a slot formed therein extending upwardly from the lower edge to provide clearance for one end of a drive shaft 55 on which a blast wheel 56 is mounted. The cover 40 encloses a blast head 57 which is shown in detail in FIG. 2. A curved front wall 58 of the blast head 57 extends downwardly below the front beam 15 as shown in FIG. 1. A vertically extending sidewall 59 is attached at one side of the front wall 58 and extends below the bumper 20. A similar wall 60 is attached to the opposite edge of the front wall 58. A three-sided seal assembly 61 extends about the lower edges of the walls 58, 59 and 60 thereby sealing such walls against a surface 62 to be cleaned.

The curved front wall 58 extends upwardly and rearwardly and joins an upper edge of a rear wall 63. The rear wall 63 includes a generally vertical upper portion 64 having an aperture 65 formed therein for connection to an air filtration system which will be described below. The rear wall 63 has a center portion 66 which extends generally downwardly and forwardly. The rear wall 63 terminates in a lower portion 67 which is positioned forwardly of the rear edge of the sealing assembly 61. An internal semi-circular wall 68 is positioned above the blast wheel 56 in close proximity to the path of the outer edges of a plurality of fins or vanes 69 extending radially outwardly from the blast wheel 56. The rearward edge of the wall 68 is attached to a lower edge of a generally vertically extending wall 70. A forward edge of the semi-circular wall 68 is attached to a lower edge of a curved wall 71 which has an upper edge attached to an upper edge of the wall 70.

A first baffle 72 extends from the junction of the walls 58 and 63 in a generally downwardly and forwardly direction across most of the distance between the upper portion 64 of the wall 63 and the wall 70. A second baffle 73 is positioned below the baffle 72 and extends from the wall 70 in a generally downwardly and rearwardly direction. A hinge 74 pivotally attaches a shot control door 75 to the walls 59 and 60 adjacent the opening between the lower ends of the walls 66 and 70. The position of the door 75 about its pivot point 74 is controlled by the lever 44. When the door 75 is rotated in a clockwise direction, a lower edge is forced against a stop 76 attached to the center portion 66 of the rear wall 63 thereby preventing the flow of shot through the gap between the wall 70 and the center portion 66 and into the area of the blast wheel 56. A refill door 77 is provided in the side wall 59 above the shot control door 75. The refill door 77 is exposed when the forward body section 40 is rotated about the hinge 41 in a clockwise direction. The refill door 77 can be opened to provide access to the shot reservoir area. The lever 44 permits the shot control door 75 to be rotated in a counterclockwise direction away from the stop 76 to provide control over the amount of shot flow from the reservoir towards the blast wheel 56.

Figure 4:
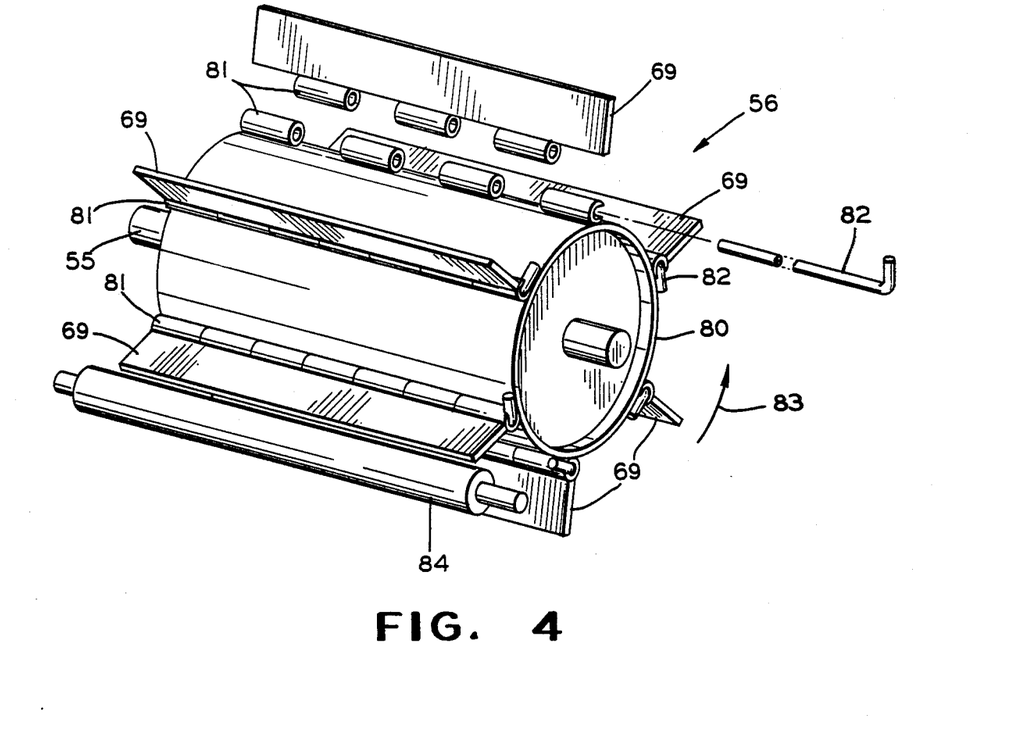
FIG. 4 is an enlarged perspective view of the blast wheel shown in FIG. 2.

The blast wheel 56 is shown in more detail in FIG. 4. The drive shaft 55 defines the longitudinal axis of a cylindrical drum 80. Six fins or vanes 69 are attached to the periphery of the drum 80 and are equally spaced. The fins 69 are attached to the drum 80 by hinges 81, each hinge having a removable hinge pin 82. Thus, the fins 69 are easily replaced through a removable access panel (not shown) provided in the side wall 59.

The blast wheel 56 generally rotates in a counterclockwise direction as shown by an arrow 83. A wear bar 84 is rotatably mounted in a gap between the center portion 66 and the lower portion 67 of the rear wall 63. The wear bar 84 is positioned at the bottom of the opening formed by the central portion 66 and the wall 70 adjacent the shot control door 75 at a point to absorb the greatest impact from the high velocity shot. As the shot flows through the opening, it is increased in velocity due to the high speed rotation of the drum 80 and the fins 69. The wear bar 84 can be made of maganese steel for increased wear resistance. As the surface of the wear bar is worn away, it can be rotated to expose a new surface.

The shot is directed against the surface 62 to be cleaned in the direction of an arrow 85 through the opening defined by the walls of the blast head. The shot rebounds from the surface 62 along with dislodged material in the direction of an arrow 86. As will be discussed below, a suction is applied at the aperture 65 to draw the shot and the contaminant material into a passageway between the curved front wall 58 and the curved wall 71 as shown by a pair of arrows 87 and 88.

The shot and the contaminant material exit the passageway and enter the area between the rear wall 63 and the wall 70. The shot and the contaminant material strike the baffles 72 and 73 thereby tending to reduce the velocity at which they are traveling. The contaminant material is drawn through the aperture 65 by suction. The larger size shot strikes the baffle 73 and rolls down its upper surface falling toward the center portion 66 of the rear wall 63 to be recycled. When the shot becomes worn, it will be small enough in diameter to be pulled through the aperture 65 to be expelled with the contaminant material.

The aperture 65 is connected to an aperture 90 formed in a front wall of the rear body section 50 by a hose 91. The aperture 65 is formed adjacent to an upper edge of the wall portion 64 and can be horizontally elongated. A cover 64 is attached to an outer surface of the wall portion 64 and extends over the aperture 65. An aperture 65a is formed in a lower portion of the cover 64a and is connected to the hose 91. The aperture 90 opens into a central filter compartment 92 which houses a plurality of filters 93. Although four of the filters 93 are shown, a second parallel row of filters is typically provided for a total of eight filters. Each of the filters 93 is suspended by a bracket 94 attached to an upper wall 95 of the compartment 92. A plurality of apertures 96 are formed in the upper wall 95, one of the apertures 96 being connected to the inside of an associated one of each of the filters 93. Thus, air containing containment material flows through the hose 91 and into the compartment 92. The contaminant material strikes the outer surface of the filters 93 and falls to a lower wall 97 of the compartment 92. The air continues through the walls of the filters 93 and upwardly through the apertures 96 into a suction compartment 98 formed in an upper portion of the rear body section 50. An aperture 99 is formed in an upper wall 100 of the rear body section 50 for fluid communication between the suction compartment 98 and a fan assembly 101. The fan assembly 101 is driven by a hydraulic motor 102.

The air from the suction compartment 98 flows through the fan assembly 101 and then flows through a hydraulic fluid radiator 103. The fan assembly 101, the hydraulic fan motor 102 and the hydraulic fluid radiator 103 are enclosed by the cover 51 shown in FIG. 1.

As will described below, the apparatus 11 includes a source of compressed air which is connected to a header 110 mounted adjacent the driver's side of the rear body section 50. A plurality of supply pipes 111 are connected to the header and extend into the suction compartment 98. Each of the supply pipes is provided with a nozzle 112 directed downwardly into a corresponding one of the apertures 96. A control circuit includes a timer which generates a signal periodically, such as every eight seconds. The signal is sent to control valves to open the connection between the header 110 and the supply pipes 111 to provide purge air to the interior of the filters 93 thereby dislodging the contaminant material buildup which falls to the lower wall 97 of the filter compartment 92.

The lower wall 97 is a grate or screen which allows the contaminant material to pass through and into a collection bin 113 mounted underneath the rear body section 50. The collection bin 113 is mounted in a pair of tracks which permit it to slide beneath the rear beam 116. A plurality of wheels 114 are provided on the bottom of the collection bin along with a handle 115.

Thus, the collection bin 113 can be removed from the apparatus 11 to enable the contaminant material to be dumped and the clean collection bin 113 returned to the apparatus 11 for further surface cleaning.

Figure 5:
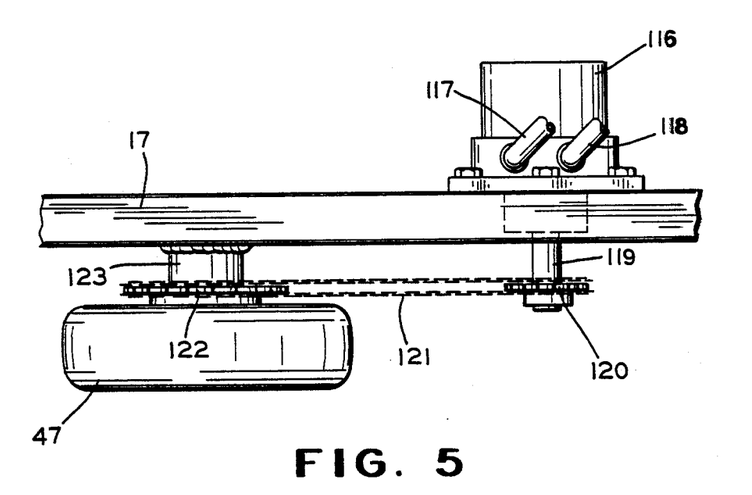
FIG. 5 is an enlarged fragmentary top plan view of one of the drive wheel assemblies of the apparatus shown in FIGS. 1 and 2.

There is shown in FIG. 5 the drive mechanism for the drive wheel 47. A similar mechanism is provided for the drive wheel on the opposite side of the apparatus 11. A hydraulic drive motor 116 is attached to an inside surface of the opposite side beam 17. The motor 116 is provided with hydraulic fluid through a pair of hydraulic lines 117 and 118. A drive shaft 119 extends through a bracket attached below the frame member 17 and terminates in a sprocket 120. The sprocket 120 engages and drives a chain 121 which in turn drives a second sprocket 122. The sprocket 122 is attached to the drive wheel 47. The drive wheel 47 is rotatably mounted on a stub axle 123 which is attached to an outer surface of the side beam 17 by any suitable means such as welding. The drive wheel 47 can be provided with a nonmarking tire made from a material such as urethane.

Figure 6:
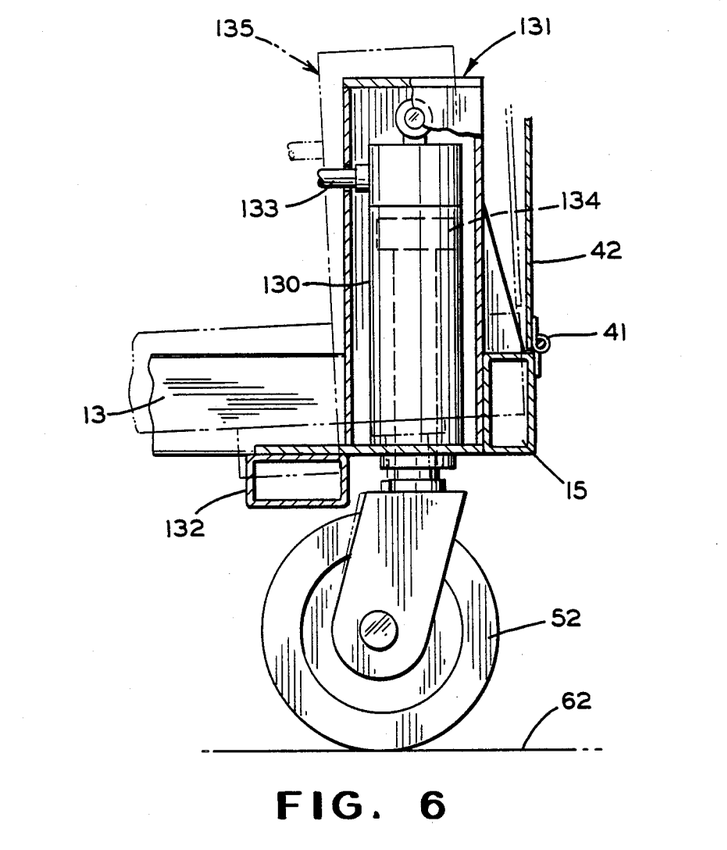
FIG. 6 is a fragmentary, enlarged side elevational view in partial cross-section of the front wheel of the apparatus shown in FIGS. 1 and 2.

The front wheel 52 and associated lift mechanism are shown in more detail in FIG. 6. The elements shown in solid lines represent the normal operating position when the front of the apparatus has been lowered to engage the sealing assembly 61 with the surface 62 to be cleaned as shown in FIG. 2. The front wheel 52 is attached at a lower end of a hydraulic cylinder 130 which is mounted in an enclosure 131. The enclosure 131 in turn is attached to the front beam 15 and can be supported on a transversely extending beam 132 which can be attached between the center beam 13 and the brace beam 19 shown in FIG. 3. The hydraulic cylinder 130 is actuated with hydraulic fluid supplied through a hydraulic line 133. When the hydraulic cylinder 130 is actuated, a piston 134 in the cylinder 130 is extended to raise the front of the apparatus 11 to a position 135 shown in phantom. The position 135 is utilized when loading the apparatus on a trailer or unloading it from the trailer, or when clearing an obstacle on the surface being cleaned. As stated above, the raising of the front end of the apparatus 11 tends to raise the sealing assembly 61 out of contact with the surface 62.

Figure 7:
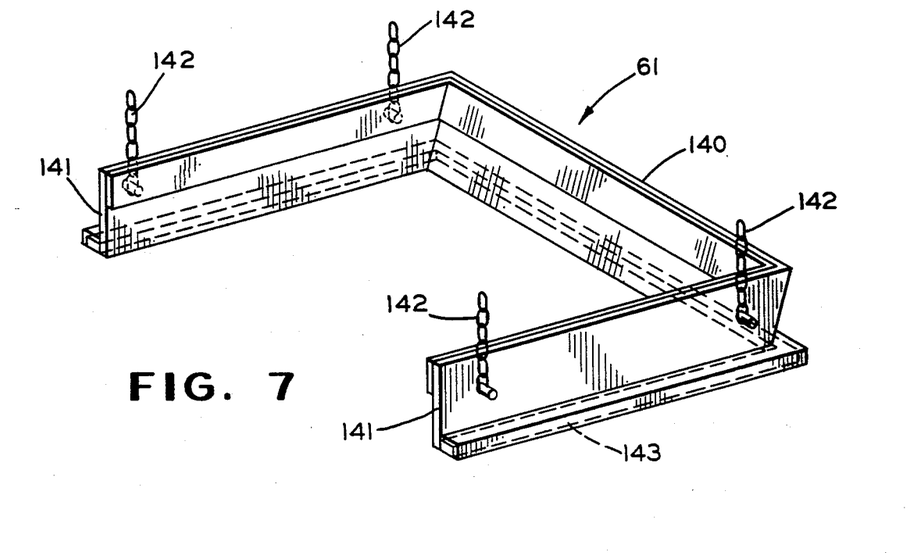
FIG. 7 is an enlarged perspective view of the magnetic seal assembly shown in FIGS. 1 and 2.

The sealing assembly 61 of FIGS. 1 and 2 is shown in more detail in FIG. 7. The assembly is generally U-shaped with a front wall 140 extending in a generally vertical direction tangentially to the curved front wall 58 of the blast head chamber. A pair of side walls 141 extend rearwardly from the ends of the front wall 140. The assembly 61 is supported by flexible connectors such as chains 142 connected between the side walls 141 and the side walls 59 and 60 of the blast head chamber. The chains 142 permit the sealing assembly 61 to follow the contour of the surface 62 as the apparatus 11 is moved. A strip of magnetic material 143 extends along the bottom edge of the front wall 140 and each of the side walls 141. The magnetic material 143 surrounds the opening on three sides to prevent the escape of any of the shot material rebounding from the surface 62 just as the front wall 140 and the side walls 141 tend to contain the contaminant material that has been loosened from the surface 62.

In case any of the shot material escapes below the lower edge of the lower portion 67 of the rear wall 63, a trailing magnetic pickup 150 is provided as shown in FIG. 2. A housing 151 of generally triangular cross-section is mounted on a bracket 152 attached to a lower surface of the stub beam 18. The housing 151 encloses a magnet 153 and is formed of a non-magnetic material such as aluminum. The magnet 153 is attached along its front edge by a hinge 154 to a bottom wall 155 of the housing 151. A rear edge of the magnet 153 is attached to one end of a pneumatic cylinder 156 which has its opposite end attached to the center beam 13. When the magnet 153 is in contact with the bottom wall 155, the housing 151 will attract any stray shot. When it is time to release the shot, the pneumatic cylinder 156 is actuated to raise the magnet 153 thereby allowing the shot to fall away.

Figure 8:
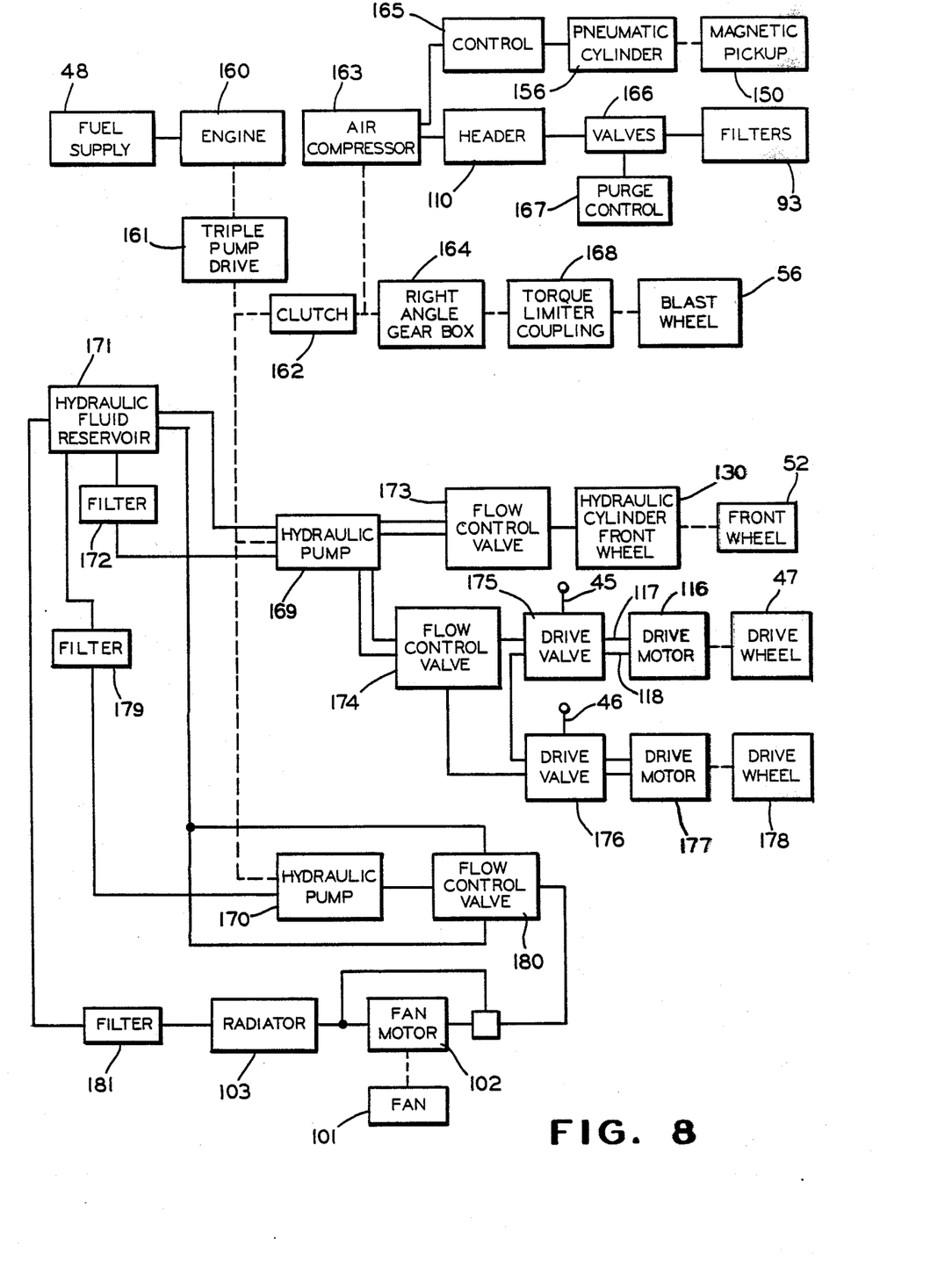
FIG. 8 is a schematic view of the mechanical systems of the apparatus shown in FIGS. 1 and 2.

A schematic diagram of the mechanical systems of the apparatus 11 is shown in FIG. 8. The fuel supply 48 is connected to an engine 160 which typically is an industrial engine that is commercially available. The engine 160 is coupled to and drives a triple pump drive 161. An output from the pump 161 is coupled through a driver operated clutch 162 to drive an air compressor 163 and a right angle gear box 164. The air compressor 163 supplies pressured air to a control 165 for actuating the pneumatic cylinder 156 which is coupled to the magnetic pickup 150. The control 165 can be any suitable pneumatic valve for actuating a pneumatic cylinder.

An output of the air compressor 163 is also connected to the header 110 which supplies the purge air to the filters 93. The header 110 is connected through a plurality of valves 166 to the filters 93. Typically, four valves are provided, one for each pair of the filters 93. A purge control 167 can be a commercially available electronic timer and valve control circuit connected to the valves 166. The purge control 167 signals the valves 166 to vent compressed air to the interior of the filters 93 to prevent a buildup in back pressure. In the preferred embodiment, the purge control 167 actuates the valves 166 in sequence so that only one pair of the filters 93 is purged at any one time. Power for the purge control 167 can be provided by, for example, an alternator driven by the engine 160.

An output from the gear box 164 is coupled to a torque limiter coupling 168 which in turn is connected to drive the blast wheel 56. Should the blast wheel 56 become jammed, the coupling 168 will slip thereby preventing damage to the gear box 164.

The triple pump drive 161 also drives a pair of hydraulic pumps 169 and 170. The hydraulic pump 169 is supplied with hydraulic fluid from a hydraulic fluid reservoir 171 and returns the hydraulic fluid to the reservoir 171 through a filter 172. The hydraulic pump 169 is connected to a flow control valve 173 which in turn supplies hydraulic fluid to the hydraulic cylinder 130 for actuating the front wheel 52. The hydraulic pump 169 is also connected to a flow control valve 174 for actuating the drive wheels of the apparatus 11. The control valve 174 is connected to a drive valve 175 which is actuated by the lever 45. The drive valve 175 is connected by the hydraulic lines 117 and 118 to the drive motor 116 for rotating the drive wheel 47 in both forward and rearward directions. The flow control valve 174 is also connected to a drive valve 176 which is actuated by the lever 46. The drive valve 176 is connected to a drive motor 177 which in turn drives a drive wheel 178 on the driver's side of the apparatus 11. Since the drive valves 175 and 176 permit independent control of the drive motors 116 and 117 respectively, each of the drive wheels 47 and 178 can be actuated for forward movement, rearward movement or no movement independently. Therefore, the apparatus 11 can be turned around on a pivot point located halfway between the drive wheels 47 and 178 for maneuvering inside a building or the like.

The hydraulic pump 170 is supplied with hydraulic fluid from the reservoir 171 through a filter 179. The pump 170 provides the hydraulic fluid through a flow control valve 180 to drive the fan motor 102 which in turn drives the fan 101. Hydraulic fluid from the fan motor 102 passes through the radiator 103 and through a filter 181 before returning to the reservoir 171. Typically, the valves 173, 174 and 180 are electrically operated and are provided with power from the same electrical power source as is utilized for the purge control 167.

In summary, the present invention provides a method and apparatus for cleaning and preparing a surface area utilizing shot blasting techniques. The flow of a ferromagnetic material such as steel shot to a blast wheel 56 is manually controlled by an operator. The steel shot is thrown against a surface to be treated. The shot rebounds and the shot and contaminant material loosened from the surface are contained by a sealing assembly 61 and a trailing magnetic pickup 151. The shot and the contaminant material are pulled from the surface by air suction through a recovery passageway into a separation chamber wherein the shot is directed back to a shot reservoir and the containment material is directed into a filter compartment. The containment material is filtered out of the air and falls into a collection bin for removal from the apparatus 11. The air suction is created by a hydraulically driven fan 101. A purge control circuit 167 periodically actuates a compressed air purge system to clean the filters.

A triple pump drive 161 supplies the power to rotate the blast wheel 56 through a right angle gear box 164 and torque limiter coupling 168 to prevent damage to the gear box should the blast wheel become jammed. The pump drive drives a first hydraulic pump 169 which provides hydraulic fluid to a hydraulic cylinder 130 for actuating a front wheel 52 to raise the front of the apparatus and the sealing assembly 61 to clear obstacles or to be loaded on or be unloaded from a trailer. The first hydraulic pump also supplies fluid through a pair of drive valves 175 and 176 to individually control the forward and reverse rotation of a pair of drive wheels 47 and 178 for moving the apparatus. A second hydraulic pump 170 supplies fluid to a fan motor 102 for driving the fan 101 and the moving air generated by the fan 101 is directed through a hydraulic fluid radiator 103 to cool the hydraulic fluid.

All of the above-described mechanical systems are mounted on a tube frame 12 which is supported by the pair of drive wheels 47 and 178 and the front wheel 52. The blast head is formed of manganese steel for long life and is enclosed in a forward body section 40 which is hinged along its front edge to the frame for easy access to the mechanical systems. A rear body section 50 covers the containment material collection system. An engine 160 drives the triple pump drive. The pump drive 161 also drives an air compressor 163 which supplies the purge air. A pneumatic cylinder 156 and control are also connected to the air compressor for actuating the trailing magnetic pickup 150 to release any stray shot it has accumulated.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mobile apparatus for treating a surface by shot blasting, comprising:
   a frame;
   at least two surface engaging wheels mounted on said frame;
   a power plant mounted on said frame;
   hydraulic drive means mounted on said frame and coupled between said power plant and two of said wheels and including a control for actuating said drive means to rotate said wheels and move said frame across a surface to be treated;
   a blast wheel mounted on said frame and coupled to said drive means for rotation, said blast wheel including a cylindrical drum mounted on a drive shaft, a plurality or radially extending fins coupled to a cylindrical peripheral surface of said drum by a plurality of hinges, each of said hinges having a hinge pin for selectively removing the associated one of said vanes;
   a blast head chamber connected between a shot reservoir and a shot recovery passageway and enclosing said blast wheel;
   fan means coupled to said drive means for generating a suction in said recovery passageway; and
   filter means connected between said fan means and said recovery passageway for separating contaminants loosened from the surface.

2. The apparatus according to claim 1 wherein said frame is formed of a plurality of tubes.

3. The apparatus according to claim 1 including at least a third surface engaging wheel mounted on said frame adjacent a forward end of said frame.

4. The apparatus according to claim 3 including a hydraulic cylinder coupled between said third wheel and said frame and a flow control valve connected between said hydraulic drive means and said hydraulic cylinder for selectively actuating said hydraulic cylinder to raise and lower the front of said frame.

5. The apparatus according to claim 1 wherein said power plant includes an engine connected to a fuel supply mounted on said frame said engine coupled to drive said hydraulic drive means.

6. The apparatus according to claim 1 wherein said hydraulic drive means includes a pump drive having an output coupled to an input of a clutch, an output of said clutch coupled to an input of a right angle gear box, an output of said gear box coupled to an input of a torque limiter coupling, and an output of said torque limiter coupling connected to said blast wheel.

7. The apparatus according to claim 1 wherein said hydraulic drive means includes a hydraulic pump connected between a hydraulic fluid reservoir and a flow control valve, a pair of drive valves each connected between said flow control valve and an associated one of a pair of drive motors, said drive motors each being coupled to one of said two wheels.

8. The apparatus according to claim 1 wherein said hydraulic drive means includes a hydraulic pump connected between a hydraulic fluid reservoir and a flow control valve and said fan means includes a hydraulic fan motor connected to said flow control valve and coupled to a fan for generating said suction in said recovery passageway.

9. The apparatus according to claim 8 including a radiator connected between said fan motor and said hydraulic fluid reservoir and wherein said fan blows air through said radiator.

10. The apparatus according to claim 1 including a filter compartment connected to said recovery passageway, a plurality of filters positioned in said filter compartment, each of said filters having an interior connected to an aperture formed in a wall of said filter compartment and a suction compartment connected between said apertures and said fan.

11. The apparatus according to claim 10 wherein said filter means includes means for automatically purging contaminants from said filters.

12. The apparatus according to claim 11 wherein said means for automatically purging includes an air compressor coupled to said hydraulic drive means, a header and a plurality of valves connected between said air compressor and said filters, and a purge control means connected to said valves, each of said valves having a nozzle oriented toward an associated one of said apertures in said filter compartment wall whereby said purge control means actuates said valves periodically to apply compressed air to the inside of said filters.

13. The apparatus according to claim 1 including a magnetic pickup means having a bracket mounted on said frame, a housing mounted on said bracket adjacent the surface, a magnet mounted on an upper surface of a lower wall of said housing, a pneumatic cylinder coupled between said magnet and said frame, and control means for actuating said pneumatic cylinder to move said magnet into and out of contact with said lower wall of said housing.

14. An apparatus for shot blasting a surface, comprising:
   a frame;
   a body supported by said frame;
   an engine mounted on said frame;
   a pump drive mounted on said frame and coupled to be driven by said engine;
   a right angle gear box having an input coupled to an output of said pump drive;
   a blast wheel coupled to an output of said gear box for rotation;
   a first hydraulic pump coupled to an output of said pump drive for rotation, said first pump connected between a reservoir of hydraulic fluid and drive means;
   a pair of surface engaging wheels mounted on said frame and coupled to said drive means for moving the apparatus across a surface;
   a second hydraulic pump coupled to an output of said pump drive for rotation, said second pump connected between said reservoir and a hydraulic fan motor for creating a suction; and
   a blast head mounted on said frame and enclosed by said body, said blast head housing said blast wheel and being connected to a fan driven by said fan motor.

15. The apparatus according to claim 14 including a filter means connected between said fan and said blast head, and a means for automatically purging said filter means of contaminants.

16. The apparatus according to claim 14 including a front wheel coupled to a hydraulic cylinder, said hydraulic cylinder being mounted on said frame and connected to said first hydraulic pump, and a flow control valve connected between said first hydraulic pump and said hydraulic cylinder for actuating said hydraulic cylinder to raise and lower the front of said frame with respect to the surface.

17. The apparatus according to claim 14 wherein said blast head has an opening adjacent the surface, and including a sealing assembly surrounding at least a peripheral portion of said opening and including magnetic means for attracting shot directed by said blast wheel onto the surface.

18. The apparatus according to claim 17 including a trailing magnetic pickup mounted below said frame adjacent a rear edge of said opening and including selectively operated magnetizing means for attracting shot directed by said blast wheel onto the surface.

19. A method of treating a surface by shot blasting, comprising:
   a. providing a source of shot, a blast wheel, and a blast head mounted on a frame, said blast head enclosing said blast wheel and defining an opening directed toward a surface to be treated;
   b. selectively controlling the flow of shot from said source to said blast head, and rotating said blast wheel to direct the shot through said opening and against the surface;
   c. magnetically attracting shot rebounding from the surface outside said opening;
   d. creating a suction in said blast head to draw shot rebounding from the surface and contaminants loosened from the surface through said blast head;
   e. separating the shot from the contaminants and returning the shot to said source;
   f. directing said contaminants to a filter chamber and depositing said contaminants in a collection bin; and
   g. hydraulically moving said frame along a path on the surface by supplying hydraulic fluid to a pair of drive motors, each of said drive motors coupled to rotate a surface engaging wheel mounted on said frame, and including controlling the rotation of said drive motors separately, rotating said blast wheel, and rotating a fan to create said suction.

20. The method according to claim 19 wherein said step f. includes providing filter means to remove said contaminants from air being moved by the rotation of said fan, and automatically providing compressed air to periodically purge said filter means.

* * * * *